W. B. GILMORE.
ANIMAL TRAP.
APPLICATION FILED AUG. 30, 1919.
1,340,442.  Patented May 18, 1920.
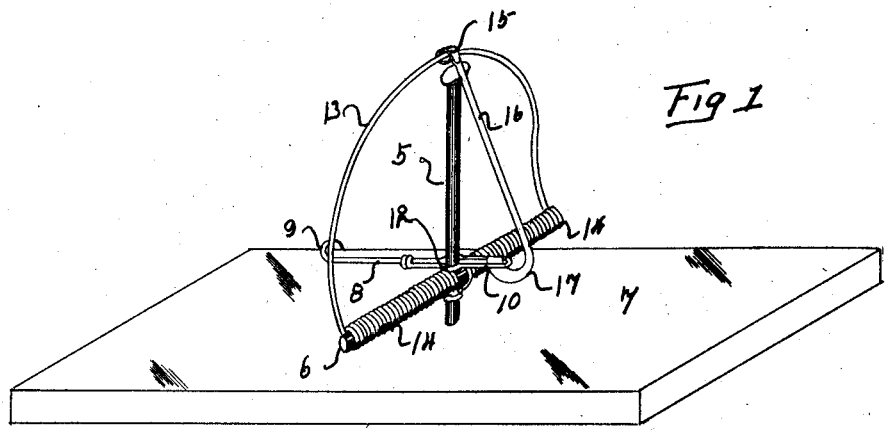
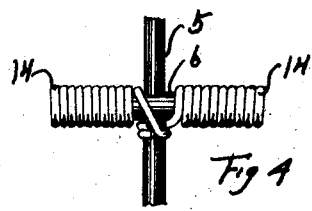
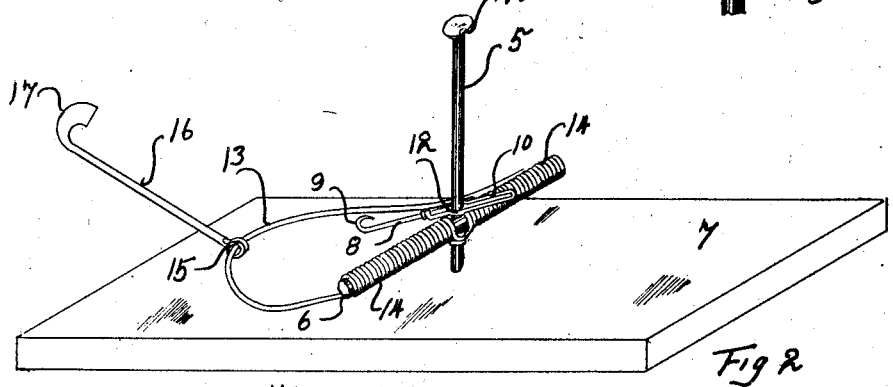
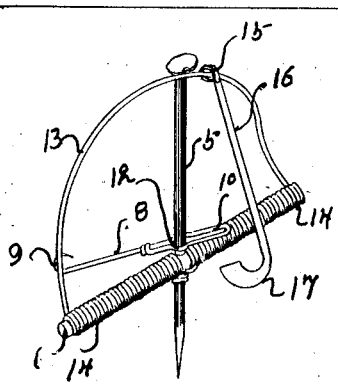
Inventor
W. B. Gilmore.
By
Attorney

UNITED STATES PATENT OFFICE.

WILLIS B. GILMORE, OF IDAHO SPRINGS, COLORADO.

ANIMAL-TRAP.

1,340,442.  Specification of Letters Patent.  Patented May 18, 1920.

Application filed August 30, 1919. Serial No. 320,880.

*To all whom it may concern:*

Be it known that I, WILLIS B. GILMORE, a citizen of the United States, residing at Idaho Springs, county of Clear Creek, and State of Colorado, have invented certain new and useful Improvements in Animal-Traps; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in animal traps, my object being to provide a device of this character which shall be exceedingly simple in construction, economical in cost, reliable, durable, and efficient in use.

My improved trap is of the type in which a spring-actuated striking bail is connected by means of a trigger with a relatively stationary member and with a bait-holding device, whereby as the latter is moved by the animal, as in the act of eating the bait, the trigger will be released and the bail moved with great force into contact with the animal, thus producing immediate death.

To be more specific, the article consists of a nail secured to a suitable support in an upright position, and connected with a spindle upon which is wound on each side of the nail a wire, forming spiral spring members, the wire merging into the striking loop or bail with which the trigger is loosely connected. The upper extremity of the nail is provided with the usual head and is notched to engage the trigger and hold the same in position at a point near where the trigger is connected with the loop, while the opposite end of the trigger is connected with a bait-holding device, which is mounted on the nail just above the spindle.

An ordinary wire nail of suitable size will answer every purpose for the upright member, though it is evident that any equivalent article may be employed. If desired, the pointed extremity of the nail might be threaded to screw into a suitable base, floor or other relatively stationary support. In placing this trap upon the market, it is not intended that it shall be supplied with a base when sold, it being assumed that the customer will prefer to connect the nail with a suitable base, as a small piece of board, or to a floor, wherever he may desire to set the trap. It is advisable, after a trap has caught one animal, to remove it from the base where the animal was caught, otherwise other animals will shun the trap by reason of the scent which is left upon the board or base where the first animal was caught. It is evident, however, that the trap may be placed upon the market attached to its own base, if desired, since a base or stationary support with which the lower extremity of the nail or upright member is connected is essential to the use of the trap.

Having briefly outlined my improvement, and indicated some of its advantages, I will proceed to describe the same more in detail, reference being made to the accompanying drawing, in which is illustrated an embodiment thereof. In this drawing:

Figure 1 is a perspective view of my improved trap connected with a base and shown in the set position, as when it is in position to catch an animal.

Fig. 2 is a similar view, showing the trap in the sprung position, or showing the parts in their position when an animal is caught.

Fig. 3 illustrates the device without a base and showing the bail engaging the head of the nail on the opposite side from that toward which the bail moves when released.

Fig. 4 is a fragmentary view on a somewhat larger scale, illustrating the manner of connecting the extremities of the wire forming the bail and spring, with the nail or upright member.

The same reference characters indicate the same parts in all the views.

Let the numeral 5 designate an ordinary nail or spike of any suitable size, the same being passed through a perforation formed in a spindle 6, the lower portion of the nail, or that which enters the stationary base 7, or other support, extending below the spindle a suitable distance for the purpose. Movably mounted on the nail above the spindle is a bait-holding device 8, one extremity, as illustrated in the drawing, being provided with a hook 9, while its opposite portion 10 is formed into a loop, which is slightly enlarged where it engages the nail, as shown at 12, so that while the device will move up and down on the nail and also rotate thereon, it will not move in a direction lengthwise of the loop, thus maintaining the two parts of the bait-holding device on opposite sides of the nail at all times in the proper relative position.

A striking bail 13 is connected with the spindle 6 in such a manner that it is under strong spring tension to move toward the base 7 when it is raised to the "set" position, as shown in Fig. 1. In the specific construction shown in the drawing, the bail is made from a piece of spring wire, enough wire being provided to form two relatively stiff coil spring members 14, through which the spindle 6 passes, the extremities of the wire being connected with the nail 5 just below the spindle.

Loosely connected with the bail by means of an eye 15, or in any other suitable manner, is a trigger, or lever-like device 16, whose free extremity is preferably somewhat flattened, as shown at 17, to enter the extremity of the loop 10 when the trap is in the set position. Furthermore, the shank of the loop near the part 17 engages a notch 18, formed in the head of the nail, whereby the trigger is prevented from moving laterally during the operation of setting the trap and after it is set. This is well illustrated in Fig. 1.

It will be understood that when the extremity 17 of the trigger is connected with the loop of the bait-holding device, when the trap is set, that the bait-holding device will be securely held in place against any sliding movement on the nail. When the trap is set for catching animals, any suitable bait may be applied at the hook end of the bait-holding device. As the animal attempts to remove the bait, or begins to eat the bait, the bait end of the bait-holding device will be moved downwardly toward the base 7 sufficiently to raise the loop portion of the device and release the trigger 16, in which event the bail 17 will instantly move toward the base and strike the animal, which is in the position it must occupy in order to reach the bait.

It is evident that by varying the size and strength of the different elements of the trap, that the latter may be adapted for catching animals of any size, from the smallest to the largest, without in any way departing from the spirit of the invention or its principle of operation.

I claim:

1. An animal trap, composed of a spring-actuated bail, a relatively stationary nail, a trigger connected with the bail and fulcrumed on the nail, and a bait-holding device movably mounted on the nail and adapted to engage with the trigger beyond the fulcrum point of the latter.

2. An animal trap, composed of a spindle, a spike rigidly connected with the spindle and extending at right angles thereto, a bail merging into coil spring members mounted on the spindle, the extremities of the spring members being made fast to the spike, a trigger loosely connected with the bail, and a bait-holding device movably mounted on the spike and extending on opposite sides of the spindle, the spike having a head notched to receive the trigger, whose free extremity is adapted to be engaged with the bait-holding device when the trap is set.

3. An animal trap, comprising a spring-actuated bail, an anchoring spike connected in operative relation with the bail, a trigger connected with the bail, and a bait-holding device, the trigger being adapted to engage with the bait-holding device in operative relation while fulcrumed on the spike and holding the bail in the striking position.

4. An animal trap, comprising a spring-actuated bail, an anchoring spike connected in operative relation with the bail and occupying an upright position when the trap is set, the head of the spike having a notch, a trigger movably connected with the bail, and a bait-holding device movably mounted on the spike, the trigger being adapted to engage with the bait-holding device and engage the notch of the spike when the trap is set.

In testimony whereof I affix my signature.

WILLIS B. GILMORE.